(12) United States Patent
Allen

(10) Patent No.: US 7,858,729 B2
(45) Date of Patent: Dec. 28, 2010

(54) METHODS OF CONTROLLING MOLECULAR WEIGHT DISTRIBUTION OF POLYMERS AND COMPOSITIONS THEREOF

(75) Inventor: Scott D. Allen, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 4 days.

(21) Appl. No.: 12/129,106

(22) Filed: May 29, 2008

(65) Prior Publication Data

US 2009/0299032 A1    Dec. 3, 2009

(51) Int. Cl.
*C08G 64/00* (2006.01)
*C08G 63/02* (2006.01)

(52) U.S. Cl. .................. 528/200; 502/102; 502/103; 502/117; 502/140; 502/155; 502/160; 526/126; 526/127; 526/160; 526/161; 528/196; 528/198

(58) Field of Classification Search .............. 502/102, 502/103, 117, 140, 150, 155, 160; 526/126, 526/127, 160, 161; 528/200
See application file for complete search history.

(56) References Cited

U.S. PATENT DOCUMENTS

| 6,133,402 A | 10/2000 | Coates et al. |
| 6,486,271 B1 | 11/2002 | Sosa et al. |
| 7,304,172 B2 | 12/2007 | Coates et al. |

FOREIGN PATENT DOCUMENTS

| EP | 0561078 B1 | 4/1997 |
| EP | 1238991 A2 | 9/2002 |
| KR | 1020070059621 A | 6/2007 |
| WO | 2007067965 A2 | 6/2007 |
| WO | 2009130182 A1 | 10/2009 |

OTHER PUBLICATIONS

Coates and Moore, Discrete Metal-Based Catalysts for Copolymerization of CO2 and Epoxides: Discovery, Reactivity, Optimization, and Mechanism, Angew. Chem., Int. Ed., 2004, vol. 43, pp. 6618-6639.
Qin et al., Cobalt-Based Complexes for the Copolymerization of Propylene Oxide and CO2: Active and Selective Catalysts for Polycarbonate Synthesis, Angew. Chem., Int. Ed., 2003, vol. 42, pp. 5484-5487.
Cohen et al., Cobalt Catylysts for the Alternating Copolymerization of Propylene Oxide and Carbon Dioxide: Combing High Activity and Selectivity, J. Am. Chem. Soc., 2005, vol. 127, pp. 10869-10878.
International Search Report and Written Opinion for PCT/US2009/045216, Jan. 11, 2010, 11 pages.

*Primary Examiner*—Terressa M Boykin
(74) *Attorney, Agent, or Firm*—Brown & Michaels, PC

(57) ABSTRACT

A catalyst, co-catalyst, and/or chain transfer agent is added at a time after initiation of an addition polymerization reaction to produce a polymer product with a widened molecular weight distribution relative to having all of the components in the original reaction mixture. The catalyst, co-catalyst, or chain transfer agent may be added discretely or continuously to the reaction to produce a product with a bimodal, trimodal, or other broadened molecular weight distribution.

32 Claims, 1 Drawing Sheet

METHODS OF CONTROLLING MOLECULAR WEIGHT DISTRIBUTION OF POLYMERS AND COMPOSITIONS THEREOF

BACKGROUND OF THE INVENTION

1. Field of the Invention

The invention pertains to the field of addition polymerization. More particularly, the invention pertains to methods of controlling the molecular weight of a product of addition polymerization.

2. Description of Related Art

Addition polymerization, also known as polyaddition and chain growth polymerization, occurs by stepwise addition of monomer units onto a growing polymer chain. Addition polymerization occurs in three distinct steps. Each chain is first initiated, then propagated, and finally terminated. Since polymerization occurs by stepwise addition of monomer units, the average molecular weight of the polymer chains increases linearly with reaction time for a given set of initial reaction conditions, assuming excess monomer is present.

Polymers that have been formed by addition polymerization include, but are not limited to, polyolefins, polycarbonates, polyesters, and polyethers. Examples of addition polymers include, but are not limited to, polyethylene (PE), polypropylene (PP), poly(vinyl chloride) (PVC), polystyrene (PS), polyacrylonitrile, poly(vinyl acetate) (PVA), poly(methyl methacrylate) (PMMA), poly(vinyl acetate) (PVA), polytetrafluoroethylene (PTFE), poly(cyclohexene carbonate) (PCHC), poly(ethylene carbonate) (PEC), poly(propylene carbonate) (PPC), and poly(propylene oxide) (PPO).

Coates and Moore (*Angew. Chem., Int. Ed.*, 43, pp. 6618-6639, 2004, hereby incorporated herein by reference) review catalysts for co-polymerization of carbon dioxide and epoxides by addition polymerization. These metal-based catalysts include, but are not limited to, aluminum-, manganese-, chromium-, cobalt-, yttrium-, zinc-, cadmium-, and nickel-based catalysts. Qin et al. (*Angew. Chem., Int. Ed.*, 42, pp. 5484-5487, 2003), Cohen et al. (*J. Am. Chem. Soc.*, 127, pp. 10869-10878, 2005), and U.S. Pat. No. 7,304,172, issued to Coates et al., which are all hereby incorporated herein by reference, disclose cobalt catalysts for co-polymerization of alkylene oxides and carbon dioxide. Coates et al. (*Angew. Chem. Int. Ed.*, 43, pp. 6618-6639, 2004) and U.S. Pat. No. 6,133,402 issued to Coates et al. which are hereby incorporated herein by reference disclose zinc-based and other metal-based catalysts for the co-polymerization of alkylene oxides and carbon dioxide.

One or more co-catalysts may be used in conjunction with a catalyst in an addition polymerization to increase the rate of polymerization and potentially allow for a decrease in pressure or temperature for the reaction in comparison to use of the catalyst alone. A co-catalyst may also improve the stereoselectivity or regioselectivity of a polymerization reaction. Coates et al. (U.S. Pat. No. 7,304,172) disclose bis(triphenylphosphine)iminium chloride, bis(triphenylphosphine)iminium pentafluorobenzoate, tetraphenylphosphonium bromide, tetraphenylphosphonium chloride, tetra-n-butylammonium chloride, triethylamine, and trioctylamine as co-catalysts for use with cobalt catalysts for co-polymerization of alkylene oxide and carbon dioxide.

A reversible chain transfer agent may be used in conjunction with a catalyst to decrease the average molecular weight of the product without otherwise significantly affecting the addition polymerization reaction. Coates et al. (U.S. Pat. No. 7,304,172) disclose carboxylic acids, such as pentafluorobenzoic acid, alcohols, such as methanol, dicarboxylic acids, diols, poly acids, polyols, and their deprotonated forms, such as sodium pentafluorobenzoate, as reversible chain transfer agents for use with cobalt catalysts for co-polymerization of propylene oxide and carbon dioxide.

SUMMARY OF THE INVENTION

A catalyst, co-catalyst, and/or chain transfer agent is added at a time after initiation of an addition polymerization reaction to produce a polymer product with a widened molecular weight distribution relative to having all of the components in the original reaction mixture. The catalyst, co-catalyst, or chain transfer agent may be added discretely or continuously to the reaction to produce a product with a bimodal, trimodal, or other broadened molecular weight distribution.

In a first embodiment of the invention, the method controls the molecular weight distribution of a product of an addition polymerization reaction. The method includes initiating the addition polymerization reaction at an initiation time and adding at least one reaction component to the reaction during at least one reaction time after the initiation time. The reaction component is selected from the group consisting of at least one catalyst, at least one co-catalyst, at least one reversible chain transfer agent, and any combination of these.

In a second embodiment of the invention, the method controls the molecular weight distribution of a polycarbonate product of an addition polymerization reaction. The method includes initiating the addition polymerization reaction at an initiation time and adding at least one reaction component to the reaction during at least one reaction time after the initiation time.

In a third embodiment of the invention, the method produces a product of an addition polymerization reaction having a predetermined molecular weight distribution. The method includes determining an initial condition for the reaction and calculating at least one addition amount of at least one reaction component to be added to the reaction during at least one reaction time after an initiation time for the reaction using at least one rate constant for the reaction. The method also includes initiating the reaction with the initial condition at an initiation time and adding the reaction component to the reaction during the reaction time. The reaction component is selected from the group consisting of at least one catalyst, at least one co-catalyst, at least one reversible chain transfer agent, and any combination of these.

In a fourth embodiment of the invention, the polymer product includes a first addition polymer product of a single batch polymerization. The first addition polymer product has a different molecular weight distribution from a second addition polymer product created during a polymerization reaction where all reaction components for the second addition polymer product were added at a beginning or an end of the polymerization reaction of the second addition polymer product.

DETAILED DESCRIPTION OF THE INVENTION

Figure 1:
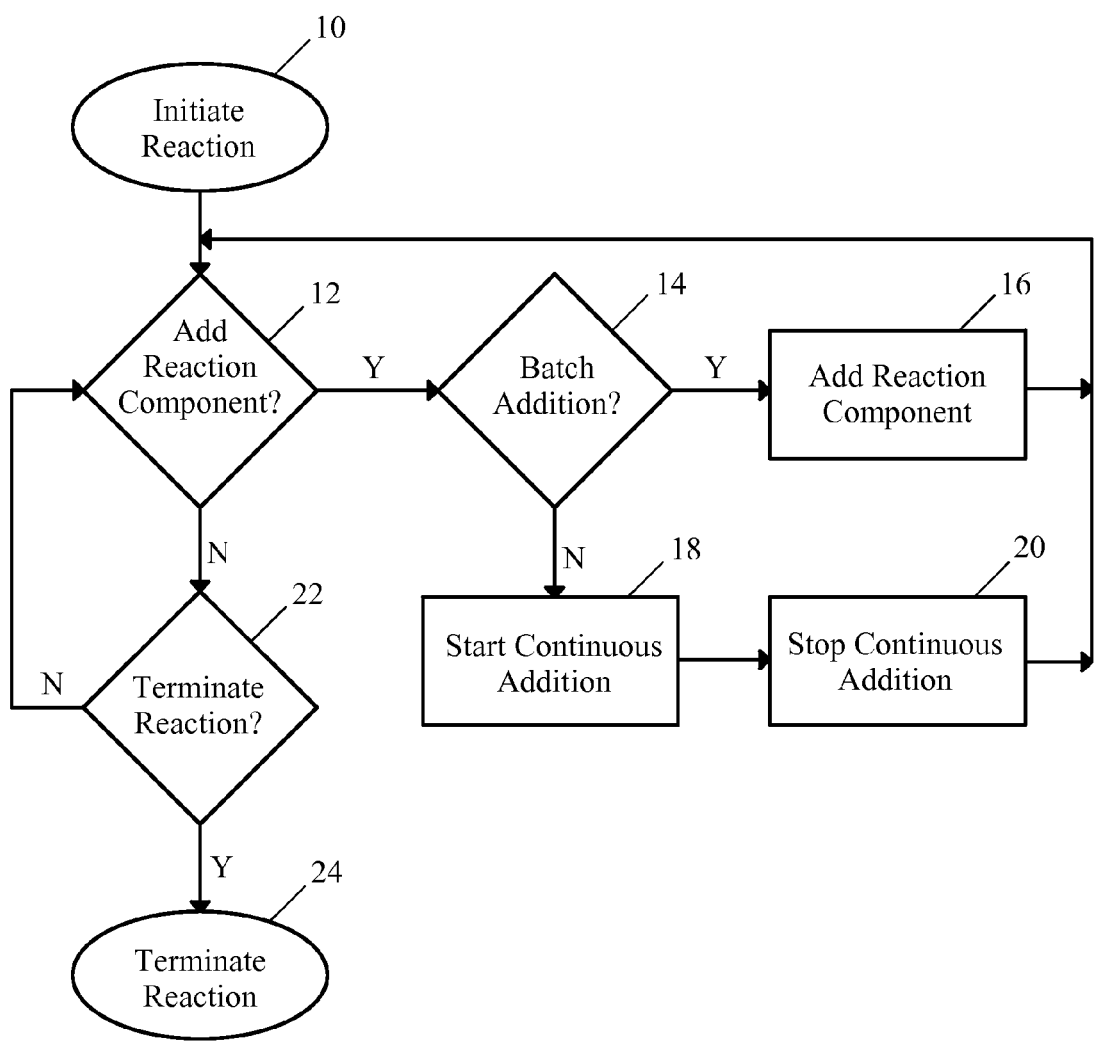
FIG. 1 shows a method of synthesizing a polymer in an embodiment of the present invention.

Addition polymerization as used herein includes any polymerization reaction occurring in a stepwise manner to add monomer units individually to growing polymer chains such that the average molecular weight of the product increases approximately linearly with time for a given set of reaction conditions.

Addition polymerizations for use with methods of the present invention include, but are not limited to, addition polymerizations to synthesize polyolefins, polycarbonates, polyhydroxyalkanoates, and polyethers, examples of which include polyethylene (PE), polypropylene (PP), polybutylene, polyisobutylene, poly(vinyl chloride) (PVC), polystyrene (PS), polyacrylonitrile, poly(vinyl acetate) (PVA), poly (methyl methacrylate) (PMMA), poly(vinyl acetate) (PVA), polytetrafluoroethylene (PTFE), poly(cyclohexene carbonate) (PCHC), poly(ethylene carbonate) (PEC), poly(propylene carbonate) (PPC), and poly(propylene oxide) (PPO). Although methods of the present invention may be used for any addition polymerization, in certain embodiments the polymerization is a co-polymerization of carbon dioxide and an epoxide. In one embodiment, the polymerization is a co-polymerization of propylene oxide and carbon dioxide.

A catalyst as used herein includes any chemical moiety that increases the reaction rate of the polymerization without being consumed in the chemical reaction. Catalysts for use with methods of the present invention include, but are not limited to, aluminum-, manganese-, chromium-, cobalt-, yttrium-, zinc-, cadmium-, and nickel-based catalysts. Although methods of the present invention may be used with any catalyst for any addition polymerization, in certain embodiments the catalyst is a metal-based catalyst for co-polymerization of carbon dioxide and an epoxide. In one embodiment, the catalyst is a cobalt-based catalyst for co-polymerization of an epoxide and carbon dioxide. In another embodiment, the catalyst is a chromium-based catalyst for co-polymerization of an epoxide and carbon dioxide. In certain embodiments, the catalyst is a zinc-based catalyst for co-polymerization of an epoxide and carbon dioxide.

A co-catalyst as used herein includes any chemical moiety that, when used in conjunction with a catalyst, increases the reaction rate of the polymerization with respect to the reaction rate without the co-catalyst. Co-catalysts for use with methods of the present invention include, but are not limited to, amines, ammonium salts, phosphonium salts, and arsonium salts, examples of which include bis(triphenylphosphine)iminium chloride (PPN—Cl), bis(triphenylphosphine) iminium pentafluorobenzoate, tetraphenylphosphonium bromide, tetraphenylphosphonium chloride, tetra-n-butylammonium chloride, triethylamine, trioctylamine, dimethyl amino pyridine (DMAP), methyl imidazole, 3-hydroxy pyridine, and dimethyl aminoquinoline (DMAQ). Although methods of the present invention may be used with any co-catalyst for any addition polymerization, in certain embodiments the co-catalyst is for co-polymerization of carbon dioxide and an epoxide. In one embodiment, the co-catalyst is PPN—Cl for co-polymerization of propylene oxide and carbon dioxide.

A reversible chain transfer agent as used herein includes any chemical moiety capable of reversibly shuttling polymer chains onto and off of the catalyst, where the polymer chain does not grow while the catalyst is not on the polymer chain. Increasing the concentration of reversible chain transfer agents lowers the average molecular weight of the synthesized polymer by increasing the number of active polymer chains. If the rate of chain transfer is fast with respect to the rate of polymerization, the polymer chains all grow at the same average rate. Reversible chain transfer agents for use with methods of the present invention may vary with the type of polymerization involved. Reversible chain transfer agents for use with methods of the present invention include, but are not limited to, carboxylic acids, alcohols, dicarboxylic acids, diols, poly acids, polyols, and their deprotonated forms, and thiols, iodoperfluoroalkane, diiodo-perfluoroalkane, pentane, propane, and butane. Although methods of the present invention may be used with any reversible chain transfer agent for any addition polymerization, in certain embodiments for co-polymerization of carbon dioxide and an epoxide, the reversible chain transfer agent is an alcohol (including polyols). In one embodiment for the co-polymerization of propylene oxide and carbon dioxide, the reversible chain transfer agent is ethylene glycol.

A chain termination agent, also known as an irreversible chain transfer agent, as used herein includes any chemical moiety capable of permanently shuttling a polymer chain off of the catalyst, where the polymer chain does not grow while the catalyst is not on the polymer chain. Chain termination agents for use with methods of the present invention may vary with the type of polymerization involved. Increasing the concentration of chain termination agents lowers the average molecular weight of the synthesized polymer. Chain termination agents for use with methods of the present invention include, but are not limited to hydrogen gas, alkyl halides, and benzyl bromide.

A chain transfer agent as used herein includes any chemical moiety capable of shuttling polymer chains onto and/or off of the catalyst, where the polymer chain does not grow while the catalyst is not on the polymer chain. Chain transfer agents include, but are not limited to, reversible chain transfer agents and chain termination agents.

A reaction component as used herein includes any chemical moiety capable of altering the molecular weight distribution of a product of addition polymerization. Reaction components for use with methods of the present invention include, but are not limited to, catalysts, co-catalysts, and chain transfer agents.

When reagents are provided only at the beginning of a polymerization, addition polymerizations produce final products with relatively narrow molecular weight distributions in comparison to condensation polymerizations. A polymer with a wider molecular weight distribution is desirable in some applications. For example, fractions of both higher molecular weight and lower molecular weight components may produce a polymer product with a desired workability and strength not attainable with a narrow molecular weight distribution of the product.

In a method of the present invention, at least one reaction component is added to an addition polymerization reaction after the initiation of the reaction to produce a polymer product with a widened molecular weight distribution. Any combination of at least one reaction component may be added to the reaction, including multiple catalysts, multiple co-catalysts, and/or multiple chain transfer agents. The reaction component or components may be added at any predetermined time, times, time period, and/or time periods during the course of the reaction and in any predetermined amount or amounts or at any predetermined rate or rates to produce the polymer product. Alternatively, the time, times, time period, and/or time periods and amount, amounts, rate, and/or rates may be determined during the course of the reaction. The reaction component or components may be added in one discrete step to the reaction, in multiple equal or different discrete steps at constant or varying intervals, or continuously for one or multiple time periods at constant or varying rates. Reaction components are preferably added under mixing to distribute the newly added materials. In one embodiment, the reaction component or components are added at one discrete time after the start of the reaction such that the product has a bimodal molecular weight distribution. In another embodiment, the reaction component or components are added at two discrete times after the start of the reaction such that the product has a trimodal molecular weight distribution.

In one embodiment, the polymerization is an addition polymerization, where the reaction component is selected from the group consisting of catalysts, co-catalysts, and reversible chain transfer agents.

In another embodiment, the polymerization is a polymerization to form a polycarbonate, where the reaction component is selected from the group consisting of catalysts, co-catalysts, and chain transfer agents.

A method of the present invention is preferably applied to a batch polymerization, where at least some of the polymer chains grow throughout the entire reaction, rather than a continuous polymerization, where a chain termination agent is periodically added to the reaction to stop all growing polymer chains at a predetermined average molecular weight and to begin growing new chains.

FIG. 1 shows a method of synthesizing a product of an addition polymerization in an embodiment of the present invention. The reaction is initiated 10 with amounts of catalyst, co-catalyst, chain transfer agent, and monomer. At a time after the initiation time, there is an inquiry 12 as to whether to add a reaction component or components to the reaction. If a reaction component or components are to be added, there is an inquiry 14 as to whether the reaction component or components are to be added all in one discrete batch. If the reaction component or components are to be added all in one discrete batch, the reaction component or components are added 16 to the reaction mixture. This is followed by another inquiry 12 as to whether to add a reaction component or components to the reaction. If the reaction component or components are to be added in a continuous manner over a period of time, addition of the reaction component or components is started 18 at a first time and then terminated 20 at a later time. If no reaction component or components are to be added, there is an inquiry 22 as to whether the reaction is to be terminated. The reaction may then be terminated 24 or continued. In an alternate embodiment to that shown in FIG. 1, additions of different reaction components may overlap each other. For example, during a continuous addition of catalyst and co-catalyst, a discrete or continuous addition of chain transfer agent may occur. Monomer may also be added at any time during the polymerization reaction, although the monomer is preferably only introduced prior to the initiation of the reaction.

At the time of initiation of the reaction 10, any amount of catalyst, co-catalyst, and/or chain transfer agent, including none of any or all, may be combined with the monomers to start the reaction.

In one embodiment of the present invention, the times, rates, and amounts of addition of the reaction component or components are predetermined based on known reaction rates for the reaction conditions and a predetermined, desired molecular weight distribution for the final polymer product.

In an alternative embodiment, the reaction is monitored and the times, rates, and amounts of addition of the reaction component or components are determined based on the monitored progress of the reaction.

The control of the reaction conditions and the amount/rate and timing of the addition of the reaction component or components allows for much greater control and flexibility of the molecular weight distribution of the final product of addition polymerization in comparison to an addition polymerization where all of the material is present in the reactor at the start of the polymerization reaction.

In another embodiment of the present invention the addition polymer product of a single batch polymerization has a different molecular weight distribution from an addition polymer product where all reaction components were added at the beginning or the end of the polymerization reaction.

The following examples are intended to be illustrative but not limiting of the principles of the present invention. In the following examples, M is the molecular weight of a unit, $R_0$ is the rate of addition of units at the start of the reaction, and $C_x$ and $r_x$ are in molar units rather than mass units. For a single component polymerization, the unit is a monomer molecule. For a co-polymerization, the unit is a molecule of the first monomer and a molecule of the second monomer. In the following examples, when co-catalyst is present or added, it is always present or added at a predetermined optimal or near-optimal ratio with catalyst, although co-catalyst may be added independently without addition of catalyst or at non-optimal ratios to alter the molecular weight distribution within the spirit of the present invention. It is assumed for the purpose of the calculations in the following examples that the reactions have not gone to completion prior to time $t_N$, although a reaction may be run for a time longer than the time expected for the reaction to go to completion within the spirit of the present invention.

EXAMPLE 1

The reaction includes catalyst in an amount $C_0$ and an excess amount of monomers at an initial time $t_0$. At a later time $t_1$, an additional amount of catalyst $C_1$ is added to the reaction. The reaction is terminated at a later time $t_N$. The reaction product has a bimodal molecular weight distribution with an approximate mole fraction of $C_0/(C_0+C_1)$ of a first portion $P_1$ having an approximate average molecular weight of $M(1+R_0(t_N-t_0))$ and an approximate mole fraction of $C_1/(C_0+C_1)$ of a second portion $P_2$ having an approximate average molecular weight of $M(1+R_0(t_N-t_1))$.

EXAMPLE 2

The reaction includes catalyst in an amount $C_0$ and an excess amount of monomers at an initial time $t_0$. At a later time $t_1$, an amount of a reversible chain transfer agent $A_1$ is added to the reaction. The reaction is terminated at a later time $t_N$. The reaction product has a bimodal molecular weight distribution with an approximate mole fraction of $C_0/(C_0+A_1)$ of a first portion $P_1$ having an approximate average molecular weight of $M(1+R_0(t_1-t_0)+X)$ and an approximate mole fraction of $A_1/(C_0+A_1)$ of a second portion $P_2$ having an approximate average molecular weight of $M(1+X)$, where $X=R_0(C_0/(C_0+A_1))(t_N-t_1)$, assuming that chain transfer is fast with respect to the rate of polymerization.

EXAMPLE 3

The reaction includes catalyst in an amount $C_0$, co-catalyst in an amount $B_0$, and an excess amount of monomers at an initial time $t_0$. At a later time $t_1$, an additional amount of catalyst $C_1$ and co-catalyst $B_1$ are added to the reaction in the same ratio as $C_0:B_0$. The reaction is terminated at a later time $t_N$. The reaction product has a bimodal molecular weight distribution with an approximate mole fraction of $(C_0+B_0)/(C_0+B_0+C_1+B_1)$ of a first portion $P_1$ having an approximate average molecular weight of $M(1+R_0(t_N-t_0))$ and an approximate mole fraction of $(C_1+B_1)/(C_0+B_0+C_1+B_1)$ of a second portion $P_2$ having an approximate average molecular weight of $M(1+R_0(t_N-t_1))$.

EXAMPLE 4

The reaction includes catalyst in an amount $C_0$, co-catalyst in an amount $B_0$, and an excess amount of monomers at an initial time $t_0$. At a later time $t_1$, an amount of a reversible chain transfer agent $A_1$ is added to the reaction. The reaction is terminated at a later time $t_N$. The reaction product has a bimodal molecular weight distribution with an approximate mole fraction of $(C_0+B_0)/(C_0+B_0+A_1)$ of a first portion $P_1$ having an approximate average molecular weight of $M(1+R_0(t_1-t_0)+X)$ and an approximate mole fraction of $A_1/(C_0+B_0+A_1)$ of a second portion $P_2$ having an approximate average molecular weight of $M(1+X)$, where $X=R_0((C_0+B_0)/(C_0+B_0+A_1))(t_N-t_1)$, assuming that chain transfer is fast with respect to the rate of polymerization.

EXAMPLE 5

The reaction includes catalyst in an amount $C_0$, co-catalyst in an amount $B_0$, reversible chain transfer agent in an amount $A_0$, and an excess amount of monomers at an initial time $t_0$. At a later time $t_1$, an amount of catalyst $C_1$, an amount of co-catalyst $B_1$, and an amount of reversible chain transfer agent $A_1$ are added to the reaction. The reaction is terminated at a later time $t_N$. The reaction product has a bimodal molecular weight distribution with an approximate mole fraction of $(C_0+B_0+A_0)/(C_0+B_0+A_0+C_1+B_1+A_1)$ of a first portion $P_1$ having an approximate average molecular weight of $M(1+R_0(t_1-t_0)+X)$ and an approximate mole fraction of $(C_1+B_1+A_1)/(C_0+B_0+A_0+C_1+B_1+A_1)$ of a second portion $P_2$ having an approximate average molecular weight of $M(1+X)$, where $X=R_0(((C_0+B_0+C_1+B_1)/(C_0+B_0+A_0+C_1+B_1+A_1))/((C_0+B_0)/(C_0+B_0+A_0)))(t_N-t_1)$, assuming that chain transfer is fast with respect to the rate of polymerization.

EXAMPLE 6

The reaction includes catalyst in an amount $C_0$, co-catalyst in an amount $B_0$, reversible chain transfer agent in an amount $A_0$, and an excess amount of monomers at an initial time $t_0$. At a later time $t_1$, an amount of catalyst $C_1$, an amount of co-catalyst $B_1$, and an amount of reversible chain transfer agent $A_1$ are added to the reaction. At a second later time $t_2$, an amount of catalyst $C_2$, an amount of co-catalyst $B_2$, and an amount of reversible chain transfer agent $A_2$ are added to the reaction. The reaction is terminated at a later time $t_N$. The reaction product has a trimodal molecular weight distribution with an approximate mole fraction of $(C_0+B_0+A_0)/(C_0+B_0+A_0+C_1+B_1+A_1+C_2+B_2+A_2)$ of a first portion $P_1$ having an approximate average molecular weight of $M(1+R_0(t_1-t_0)+X+Y)$, an approximate mole fraction of $(C_1+B_1+A_1)/(C_0+B_0+A_0+C_1+B_1+A_1+C_2+B_2+A_2)$ of a second portion $P_2$ having an approximate average molecular weight of $M(1+X+Y)$, and an approximate mole fraction of $(C_2+B_2+A_2)/(C_0+B_0+A_0+C_1+B_1+A_1+C_2+B_2+A_2)$ of a third portion $P_3$ having an approximate average molecular weight of $M(1+Y)$, where $X=R_0(((C_0+B_0+C_1+B_1)/(C_0+B_0+A_0+C_1+B_1+A_1))/((C_0+B_0)/(C_0+B_0+A_0)))(t_2-t_1)$ and $Y=R_0(((C_0+B_0+C_1+B_1+C_2+B_2)/(C_0+B_0+A_0+C_1+B_1+A_1+C_2+B_2+A_2))/((C_0+B_0)/(C_0+B_0+A_0)))(t_N-t_2)$, assuming that chain transfer is fast with respect to the rate of polymerization.

EXAMPLE 7

The reaction includes catalyst in an amount $C_0$, co-catalyst in an amount $B_0$, reversible chain transfer agent in an amount $A_0$, and an excess amount of monomers at an initial time $t_0$. At later times $(t_1, t_2, \ldots, t_{N-2}, \text{ and } t_{N-1})$, amounts of catalyst $(C_1, C_2, \ldots, C_{N-2}, \text{ and } C_{N-1})$, co-catalyst $(B_1, B_2, \ldots, B_{N-2}, \text{ and } B_{N-1})$, and reversible chain transfer agent $(A_1, A_2, \ldots, A_{N-2}, \text{ and } A_{N-1})$ are added to the reaction. The reaction is terminated at a later time $t_N$. The reaction product has an n-modal molecular weight distribution with an approximate mole fraction of $(C_i+B_i+A_i)/(\Sigma C+\Sigma B+\Sigma A)$ for each portion $P_i$, where i=0 to n−1, each portion $P_i$ having an approximate average molecular weight of $M(1+\Sigma(R_0(((C_i+B_i)/(\Sigma C+\Sigma B+\Sigma A))/((C_0+B_0)/(C_0+B_0+A_0)))(t_{i+1}-t_i))$, assuming that chain transfer is fast with respect to the rate of polymerization.

EXAMPLE 8

The reaction includes catalyst in an amount $C_0$ and an excess amount of monomers at an initial time $t_0$. At a later time $t_1$, an amount of a reversible chain transfer agent $A_1$ is added to the reaction. At a later time $t_2$, an amount of a chain termination agent $D_2$, where $D_2$ is less than $C_0+A_1$, is added to the reaction. The reaction is terminated at a later time $t_N$. The reaction product has a trimodal molecular weight distribution with an approximate mole fraction of $C_0(C_0+A_1-D_2)/(C_0+A_1)^2$ of a first portion $P_1$ having an approximate average molecular weight of $M(1+R_0(t_1-t_0)+X)$, an approximate mole fraction of $A_1(C_0+A_1-D_2)/(C_0+A_1)^2$ of a second portion $P_2$ having an approximate average molecular weight of $M(1+X)$, an approximate mole fraction of $D_2/(C_0+A_1)$ of a third portion $P_3$ having an approximate average molecular weight of $M(1+Y)$, where $X=R_0(C_0/(C_0+A_1))(t_N-t_1)$ and $Y=R_0(C_0/(C_0+A_1))(t_N-t_2)$, assuming that chain transfer and chain termination is fast with respect to the rate of polymerization.

EXAMPLE 9

The reaction includes catalyst in an amount $C_0$ and an excess amount of monomers at an initial time $t_0$. For a time period $t_1$ to $t_2$, additional catalyst is added continuously to the reaction at a constant rate $r_C$. The reaction is terminated at a time $t_N$. The reaction product has a broadened molecular weight distribution. The reaction product has a molecular weight distribution with an approximate mole fraction of $C_0/(C_0+r_c(t_2-t_1))$ of a first portion $P_1$ having an approximate average molecular weight of $M(1+R_0(t_N-t_0))$ and the remaining portion $P_2$ being approximately equally divided on a molar basis across the average molecular weight range of $M(1+R_0(t_N-t_2))$ to $M(1+R_0(t_N-t_1))$.

EXAMPLE 10

The reaction includes catalyst in an amount $C_0$ and an excess amount of monomers at an initial time $t_0$. For a time period $t_1$ to $t_2$, a reversible chain transfer agent is added continuously to the reaction at a constant rate $r_A$. The reaction is terminated at a time $t_N$. The reaction product has a broadened molecular weight distribution. The reaction product has a molecular weight distribution with an approximate mole fraction of $C_0/(C_0+r_A(t_2-t_1))$ of a first portion $P_1$ having an approximate average molecular weight of $M(1+R_0(t_1-t_0)+$ X+Y) and the remaining portion $P_2$ being divided across the average molecular weight range of $M(1+Y)$ to $M(1+X+Y)$, where $X=R_0\int(C_0/(C_0+r_A(t-t_1)))dt$ from $t_1$ to $t_2$ and $Y=R_0(C_0/(C_0+r_A(t_2-t_1)))(t_N-t_2)$.

EXAMPLE 11

The reaction includes catalyst in an amount $C_0$, co-catalyst in an amount $B_0$, and an excess amount of monomers at an initial time $t_0$. For a time period $t_1$ to $t_2$, additional catalyst and co-catalyst are added continuously to the reaction at constant rates $r_C$ and $r_B$ in the same ratio as $C_0:B_0$, respectively. The reaction is terminated at a later time $t_N$. The reaction product has a broadened molecular weight distribution. The reaction product has a molecular weight distribution with an approximate mole fraction of $(C_0+B_0)/(C_0+r_A(t_2-t_1)+B_0+r_B(t_2-t_1))$ of a first portion $P_1$ having an approximate average molecular weight of $M(1+R_0(t_N-t_0))$ and the remaining portion $P_2$ being approximately equally divided on a molar basis across the average molecular weight range of $M(1+R_0(t_N-t_2))$ to $M(1+R_0(t_N-t_1))$.

EXAMPLE 12

The reaction includes catalyst in an amount $C_0$, co-catalyst in an amount $B_0$, and an excess amount of monomers at an initial time $t_0$. For a time period $t_1$ to $t_2$, a reversible chain transfer agent is added continuously to the reaction at a constant rate $r_A$. The reaction is terminated at a later time $t_N$. The reaction product has a broadened molecular weight distribution. The reaction product has a molecular weight distribution with an approximate mole fraction of $(C_0+B_0)/(C_0+B_0+r_A(t_2-t_1))$ of a first portion $P_1$ having an approximate average molecular weight of $M(1+R_0(t_1-t_0)+X+Y)$ and the remaining portion $P_2$ being divided across the average molecular weight range of $M(1+Y)$ to $M(1+X+Y)$, where $X=R_0\int((C_0+B_0)/(C_0+B_0+r_A(t-t_1)))dt$ from $t_1$ to $t_2$ and $Y=R_0((C_0+B_0)/(C_0+B_0+r_A(t_2-t_1)))(t_N-t_2)$.

EXAMPLE 13

The reaction includes catalyst in an amount $C_0$, co-catalyst in an amount $B_0$, reversible chain transfer agent in an amount $A_0$, and an excess amount of monomers at an initial time $t_0$. For a time period $t_1$ to $t_2$, additional catalyst, co-catalyst, and reversible chain transfer agent are added continuously to the reaction at constant rates $r_C$, $r_B$, and $r_A$, respectively. The reaction is terminated at a later time $t_N$. The reaction product has a broadened molecular weight distribution. The reaction product has a molecular weight distribution with an approximate mole fraction of $(C_0+B_0+A_0)/(C_0+B_0+A_0+(r_A+r_B+r_C)(t_2-t_1))$ of a first portion $P_1$ having an approximate average molecular weight of $M(1+R_0(t_1-t_0)+X+Y)$ and the remaining portion $P_2$ being divided across the average molecular weight range of $M(1+Y)$ to $M(1+X+Y)$, where $X=R_0\int((C_0+B_0+A_0)/(C_0+B_0+A_0+(r_A+r_B+r_C)(t-t_1)))dt$ from $t_1$ to $t_2$ and $Y=R_0((C_0+B_0+A_0)/(C_0+B_0+A_0+(r_A+r_B+r_C)(t_2-t_1)))(t_N-t_2)$.

EXAMPLE 14

The reaction includes an excess amount of monomers at an initial time $t_0$. For a time period $t_0$ to $t_1$, catalyst, co-catalyst, and reversible chain transfer agent are added continuously to the reaction at constant rates $r_C$, $r_B$, and $r_A$, respectively. The reaction is terminated at a later time $t_N$. The reaction product has a broadened molecular weight distribution. The reaction product has a molecular weight distribution divided across the average molecular weight range of $M(1+R(t_N-t_1))$ to $M(1+R(t_N-t_0))$, where R is the rate of addition of monomer units for a catalyst:co-catalyst:reversible chain transfer agent ratio of $r_C:r_B:r_A$.

EXAMPLE 15

The reaction includes catalyst in an amount $C_0$, co-catalyst in an amount $B_0$, reversible chain transfer agent in an amount $A_0$, and an excess amount of monomers at an initial time $t_0$. At later time periods ($t_1$ to $t_2$, $t_3$ to $t_4$, ..., $t_{N-4}$ to $t_{N-}$, and $t_{N-2}$ to $t_{N-1}$), catalyst, co-catalyst, and reversible chain transfer agent are added continuously to the reaction at constant rates $r_{C,1}$, $r_{C,2}$, ..., $r_{C,(N-3)/2}$, and $r_{C,(N-1)/2}$, $r_{B,1}$, $r_{B,2}$, ..., $r_{B,(N-3)/2}$, and $r_{B,(N-1)/2}$, and $r_{A,1}$, $r_{A,2}$, ..., $r_{A,(N-3)/2}$, and $r_{A,(N-1)/2}$, respectively. The reaction is terminated at a later time $t_N$. The reaction product has a broadened molecular weight distribution. The reaction product has a molecular weight distribution with an approximate mole fraction of $(C_0+B_0+A_0)/(C_0+\Sigma r_{C,i}(t_{2i}-t_{2i-1})+B_0+\Sigma r_{B,i}(t_{2i}-t_{2i-1})+A_0+\Sigma r_{A,i}(t_{2i}-t_{2i-1}))$ of a first portion $P_1$ having an approximate average molecular weight of $M(1+R_0(t_1-t_0)+\Sigma X_i+\Sigma Y_i)$, where $i=1$ to $(N-1)/2$ and the remaining portions $P_i$ each having an approximate mole fraction of $(r_{C,i}(t_{2i}-t_{2i-1})+r_{B,i}(t_{2i}-t_{2i-1})+r_{A,i}(t_{2i}-t_{2i-1}))/(C_0+\Sigma r_{C,i}(t_{2i}-t_{2i-1})+B_0+\Sigma r_{B,i}(t_{2i}-t_{2i-1})+A_0+\Sigma r_{A,i}(t_{2i}-t_{2i-1}))$, each being divided across an average molecular weight range of $M(1+\Sigma X_i+\Sigma Y_i-X_i)$ to $M(1+\Sigma X_i+\Sigma Y_i)$, where $X_i=R_0\int((C_0+B_0+A_0)/(C_0+B_0+A_0+(r_{A,i}+r_{B,i}+r_{C,i})(t-t_{2i-1})))dt$ from $t_{2i-1}$ to $t_{2i}$ and $Y_i=R_0((C_0+B_0+A_0)/(C_0+B_0+A_0+(r_{A,i}+r_{B,i}+r_{C,i})(t_{2i+1}-t_{2i}))$.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of broadening a molecular weight distribution of a polymer product of an addition polymerization reaction comprising the steps of:
   a) starting the addition polymerization reaction at a start time with monomer of the polymer product; and
   b) adding at least one reaction component to the reaction during at least one reaction time after the start time;
   wherein the reaction component is selected from the group consisting of:
      i) at least one catalyst;
      ii) at least one co-catalyst;
      iii) at least one reversible chain transfer agent; and
      iv) any combination of i), ii), and iii).

2. The method of claim 1, wherein the catalyst comprises at least one metal-based catalyst selected from the group consisting of:
   A) an aluminum-based catalyst;
   B) a manganese-based catalyst;
   C) a chromium-based catalyst;
   D) a cobalt-based catalyst;
   E) a yttrium-based catalyst;
   F) a zinc-based catalyst;
   G) a cadmium-based catalyst;
   H) a nickel-based catalyst; and
   I) any combination of A) through H).

3. The method of claim 1, wherein the reaction component is added continuously to the reaction.

4. The method of claim 3, wherein a rate of continuous addition is varied with time.

5. The method of claim 1, wherein the product of the addition polymerization reaction is a polycarbonate.

6. The method of claim 5, wherein the addition polymerization is a co-polymerization of carbon dioxide and an epoxide.

7. The method of claim 6, wherein the addition polymerization is a co-polymerization of carbon dioxide and propylene oxide.

8. The method of claim 1, wherein the reaction component is added in one or more discrete steps to the reaction.

9. The method of claim 1, wherein the reaction component is added in a single step such that the molecular weight distribution of the product is bimodal.

10. The method of claim 1, wherein the reaction component is added in two steps such that the molecular weight distribution of the product is trimodal.

11. The method of claim 1 further comprising adding a chain termination agent prior to an end time when the reaction is stopped.

12. A product made by the method of claim 1.

13. A method of broadening a molecular weight distribution of a polycarbonate product of an addition polymerization reaction comprising the steps of:
    a) starting the addition polymerization reaction at a start time with monomer of the polycarbonate product; and
    b) adding at least one reaction component to the reaction during at least one reaction time after the start time.

14. The method of claim 13, wherein the reaction component is selected from the group consisting of:
    i) at least one catalyst;
    ii) at least one co-catalyst;
    iii) at least one chain transfer agent; and
    iv) any combination of i), ii), and iii).

15. The method of claim 14, wherein the catalyst comprises at least one metal-based catalyst selected from the group consisting of:
    A) an aluminum-based catalyst;
    B) a manganese-based catalyst;
    C) a chromium-based catalyst;
    D) a cobalt-based catalyst;
    E) a yttrium-based catalyst;
    F) a zinc-based catalyst;
    G) a cadmium-based catalyst;
    H) a nickel-based catalyst; and
    I) any combination of A) through H).

16. The method of claim 13, wherein the reaction component is added continuously to the reaction.

17. The method of claim 16, wherein a rate of continuous addition is varied with time.

18. The method of claim 13, wherein the addition polymerization is a co-polymerization of carbon dioxide and an epoxide.

19. The method of claim 18, wherein the addition polymerization is a co-polymerization of carbon dioxide and propylene oxide.

20. The method of claim 13, wherein the reaction component is added in one or more discrete steps to the reaction.

21. The method of claim 13, wherein the reaction component is added in a single step such that the molecular weight distribution is bimodal.

22. The method of claim 13, wherein the reaction component is added in two steps such that the molecular weight distribution is trimodal.

23. A method of synthesizing a polymer product of an addition polymerization reaction having a predetermined molecular weight distribution, the method comprising the steps of:
    a) determining an initial condition for the reaction;
    b) calculating at least one addition amount of at least one reaction component to be added to the reaction during at least one reaction time after a start time for the reaction using at least one rate constant for the reaction;
    c) starting the reaction with the initial condition at the start time; and
    d) adding the addition amount of the reaction component to the reaction during the reaction time;
    wherein the reaction component is selected from the group consisting of:
        i) at least one catalyst;
        ii) at least one co-catalyst;
        iii) at least one reversible chain transfer agent; and
        iv) any combination of i), ii), and iii).

24. The method of claim 23, wherein the catalyst comprises at least one metal-based catalyst selected from the group consisting of:
    A) an aluminum-based catalyst;
    B) a manganese-based catalyst;
    C) a chromium-based catalyst;
    D) a cobalt-based catalyst;
    E) a yttrium-based catalyst;
    F) a zinc-based catalyst;
    G) a cadmium-based catalyst;
    H) a nickel-based catalyst; and
    I) any combination of A) through H).

25. The method of claim 23, wherein the reaction component is added continuously to the reaction.

26. The method of claim 23, wherein the product of the addition polymerization reaction is a polycarbonate.

27. The method of claim 26, wherein the addition polymerization is a co-polymerization of carbon dioxide and an epoxide.

28. The method of claim 27, wherein the addition polymerization is a co-polymerization of carbon dioxide and propylene oxide.

29. The method of claim 23, wherein the reaction component is added in one or more discrete steps to the reaction.

30. The method of claim 23, wherein the reaction component is added in a single step such that the molecular weight distribution is bimodal.

31. The method of claim 23, wherein the reaction component is added in two steps such that the molecular weight distribution is trimodal.

32. The method of claim 23 further comprising adding a chain termination agent prior to an end time when the reaction is stopped.

\* \* \* \* \*